(12) United States Patent
Oicherman et al.

(10) Patent No.: US 8,861,849 B2
(45) Date of Patent: Oct. 14, 2014

(54) IMAGE PROCESSING

(75) Inventors: Boris Oicherman, Jerusalem (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 13/145,107

(22) PCT Filed: Jan. 20, 2009

(86) PCT No.: PCT/US2009/031427
§ 371 (c)(1),
(2), (4) Date: Jul. 18, 2011

(87) PCT Pub. No.: WO2010/085237
PCT Pub. Date: Jul. 29, 2010

(65) Prior Publication Data
US 2011/0274348 A1    Nov. 10, 2011

(51) Int. Cl.
G06K 9/00    (2006.01)
G06T 11/00    (2006.01)

(52) U.S. Cl.
CPC .................... *G06T 11/001* (2013.01)
USPC ....................................................... 382/167

(58) Field of Classification Search
USPC ............ 382/162, 167; 345/589–594; 358/1.9, 358/518
See application file for complete search history.

(56) References Cited

U.S. PATENT DOCUMENTS

| 6,309,342 | B1 | 10/2001 | Blazey et al. |
| 7,003,139 | B2 | 2/2006 | Endrikhovski et al. |
| 7,233,684 | B2 | 6/2007 | Fedorovskaya et al. |
| 7,714,874 | B2 * | 5/2010 | Jang et al. ...................... 345/593 |
| 8,081,193 | B2 * | 12/2011 | Jang et al. ...................... 345/594 |
| 8,363,063 | B2 * | 1/2013 | Ou et al. ........................ 345/589 |
| 8,427,498 | B2 * | 4/2013 | Ou et al. ........................ 345/594 |
| 2006/0098025 | A1 | 5/2006 | Jang et al. |
| 2008/0253650 | A1 | 10/2008 | Kuniba |

FOREIGN PATENT DOCUMENTS

JP    2002-057912    2/2002

OTHER PUBLICATIONS

Elena A. Fedorovskaya et al., "Affective imaging: Psychological and physiological reactions to individually chosen images," Human Vision and Electronic Imaging VI, Bernice E. Rogowitz, Thrasyvoulos N. Pappas, Editors, Proceedings of SPIE vol. 4299, pp. 524-532 (2001).

Maurizio Codispoti et al., "Affective reactions to briefly presented pictures," Psychophysiology, 38 (2001), pp. 474-478.

Hyeon-Jeong Suk, "A Study on the Affective Judgment of Color Across Media and in Relation to Visual Stimuli," Doctoral Thesis. University of Mannheim (2006) 232 pages.

N. Jacobson et al., "Color as a determined communicaton," IBM Systems Journal, vol. 35, Nos. 3&4, 1996, pp. 526-538.

Li-Chen Ou et al., "A Colour Harmony Model for Two-Colour Combinations," Color research and application, vol. 31, No. 3, Jun. 2006, pp. 191-204.

(Continued)

*Primary Examiner* — Ishrat I Sherali

(57) ABSTRACT

Embodiments of the present invention relate to image processing an enhancement relative to the color emotion domain. In one embodiment, an image processor comprises an input (202) to receive image pixel data and an input (204) to receive color emotion indicia, the processor being arranged to adjust target pixels of the image in a color encoding space on the basis of the color emotion indicia and to output image pixel data resulting therefrom.

16 Claims, 6 Drawing Sheets

(56) References Cited

OTHER PUBLICATIONS

Peter J. Lang et al., "Looking at pictures: Affective, facial, visceral, and behavioral reactions," Psyt.hophysiology. 30 (1993), pp. 261-273, Cambridge Univ. Press.

C. J. Bartleson et al., "On the Preferred Reproduction of Flesh, Blue-Sky, and Green-Grass Colors" Photographic Science and Engineering, vol. 6, No. 1, Jan.-Feb. 1962, pp. 19-25.

Uri Feldman et al., "Quantifying tne Experience of Color," SPIE vol. 1913, pp. 537-547 (1993).

Tetsya Sato et al., "Quantitative Evaluation and Categonization of Human Emotion Induced by Colour," Advances in Colour Science and Technology, vol. 3, No. 3, Jul. 2000, pp. 53-59.

Li-Chen Ou et al., "A study of colour emotion and colour preference: Part I: Colour emotions for single colours," (Univ. of Derby), Color Research and Application, vol. 29, pp. 232-240 (Apr. 2004).

Li-Chen Ou et al., "A study of colour emotion and colour preference. Part II: Colour emotions for two-colour combinations," (Univ. of Derby), Color Research and Application, vol. 29, pp. 292-298 (Aug. 2004).

Li-Chen Ou et al., "A study of colour emotion and colour preference: Part III: Colour preference modeling," (Univ. of Derby), Color Research and Application, vol. 29, pp. 381-389 (Oct. 2004).

\* cited by examiner

IMAGE PROCESSING

CROSS-REFERENCE TO RELATED APPLICATIONS

This application is a National Stage application of International Application No. PCT/US2009/031427, filed Jan. 20, 2009, the disclosure of which are hereby incorporated by reference in its entirety.

FIELD

The present invention relates to image processing and, more particularly, to image enhancement relative to the colour emotion domain.

BACKGROUND

It is known to vary the technical characteristics of a digital image, for example a digital photograph, by removing technical faults introduced by a camera that took the photograph, or by modifying the technical characteristics of the image to make it more "pleasing". For example, it is known to adjust sharpness and contrast, reduce noise, correct red-eye and even modify certain colours, such as colours of the skin, grass or sky. However, along with the technical qualities, images possess emotional qualities: for example, images can appear "sad" or "happy", "upsetting" or "relaxing", "warm" or "chilly", and so on. Enhancing an image's technical characteristics can result in a less satisfactory image, in which the emotion has been diluted or lost. For example, colours of an image photographed in candle light can be adjusted to be perfectly balanced from a technical point of view but, by doing so, the "warmness" of the image can be destroyed. On the other hand, improving the emotional characteristics of such an image by enhancing its "warmth" can result in a better image even if this is done at the expense of degrading its "technical" qualities.

SUMMARY

According to a first aspect, the present invention provides an image processor comprising an input to receive image data and an input to receive colour emotion indicia, the processor being configured to adjust image attributes in a colour encoding space on the basis of the colour emotion indicia and to output an image resulting therefrom.

BRIEF DESCRIPTION OF THE DRAWINGS

Various features and advantages of the invention will become apparent from the following description of embodiments of the invention, given by way of example only, which is made with reference to the accompanying drawings, of which.

DETAILED DESCRIPTION

Figure 1:
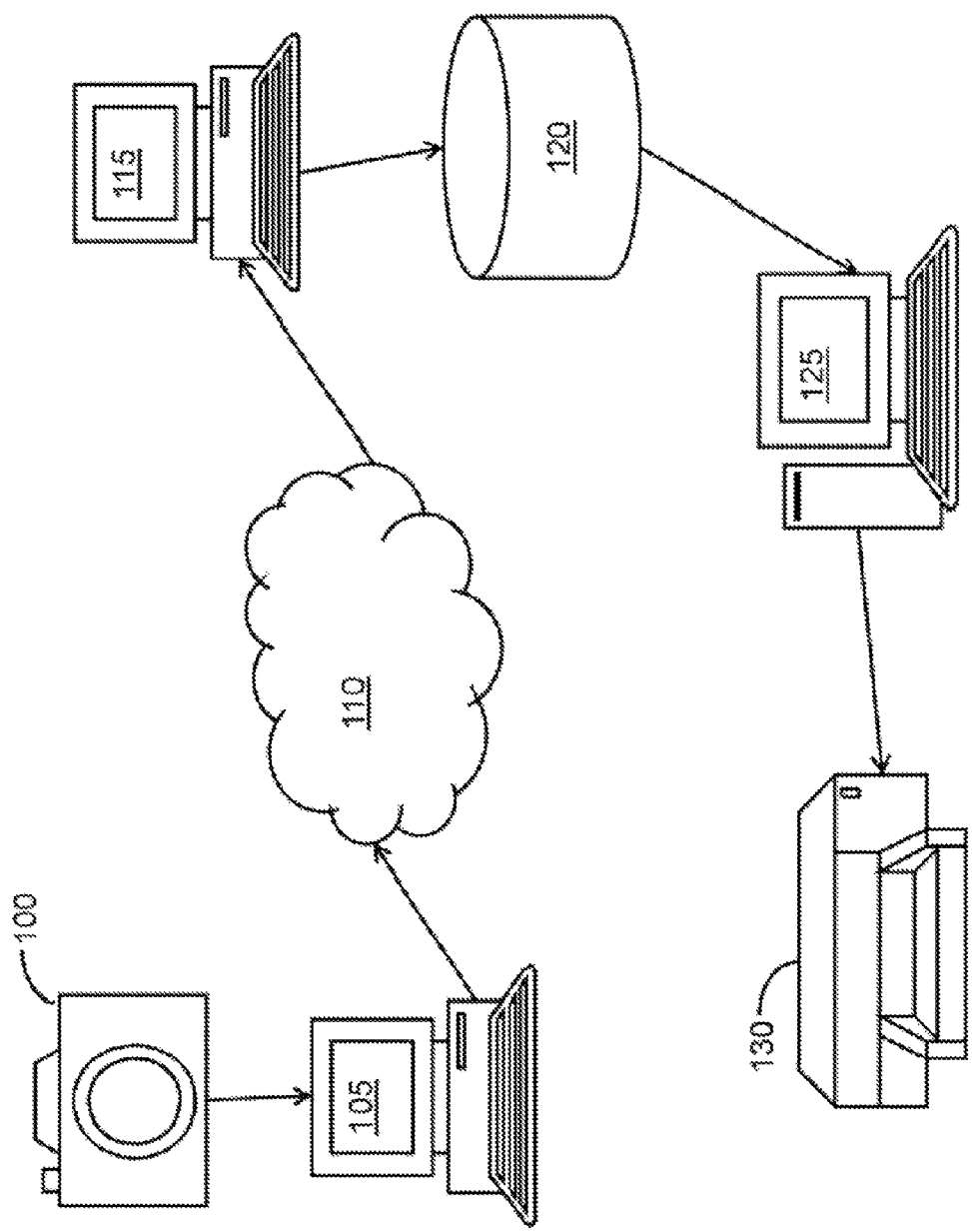
FIG. 1 is a diagram of a prior art imaging system in which embodiments of the present invention find application.

Various embodiments of the present invention will now be described in more detail with reference to the accompanying drawings. It will be appreciated that the invention is not limited in its application to the details of method and the arrangement of components as set forth in the following description or illustrated in the drawings. It will be apparent to a person skilled in the art that additional embodiments of the present invention not detailed in the description are possible and will fall within the scope of the present claims. Accordingly, the following description should not be interpreted as limiting in any way, and the scope of protection is defined solely by the claims appended hereto.

The diagram in FIG. 1 is a schematic diagram of a basic imaging system of the kind known from the prior art. The same general system can be used according to embodiments of the present invention, though with different image enhancement processes being used, as will be described. According to FIG. 1, digital images are captured using a camera 100 and are downloaded onto a personal computer system 105. Selected images are then sent via a network 110, for example the Internet, to a computer 115 in a photographic printing laboratory. The computer 115 stores the images in a data store 120 in a print queue. The images are then retrieved by an imaging computer 125, which processes the images for example as described above with reference to FIGS. 7a and 7b, and sends them to a printer 130 to be printed. The printed images are subsequently checked for quality—typically a manual process—and sent to the originator. The computers in this exemplary system all typically operate under a Microsoft Windows™ operating system; but could equally be operating under another operating system such as Linux™.

While the image processing is shown as being carried out on an imaging computer 125, it will be appreciated that some or all of the image processing could be carried out at other points in the system. For example, at least a part of the image processing could occur on the personal computer system 105, on the photographic laboratory computer 115 or even in the printer 130 itself, if provided with appropriate processing capability. Such processing could occur at any other appropriate point in this or any other appropriate system. For example, the image processing could even take place on the camera itself.

Embodiments of the present invention relate to image processing pipelines that enhance images in relation to desired perceptual qualities such as 'emotion' and 'affect'. Such qualities are thought of as 'artistic' qualities rather than technical characteristics of an image. En effect, embodiments of the present invention determine a desired image enhancement in a colour emotion domain and map the enhancement from the colour emotion domain to a colour encoding domain, as will be described below.

While embodiments of the present invention are described in relation to image enhancement for printed imams, they apply to image enhancement in general and, for example, could be applied (without limitation) to electronically displayed images, to be displayed on any kind of electronic display or projected onto a screen.

Before describing embodiments of the present invention, some background will now be provided. The perceptual quality of 'colour emotion' is an active area of colour science research. It aims at developing psychophysical measures to be used in automated decision tools for generation of colour palettes having predefined emotional properties. In colour emotion studies, observers view a colour stimulus: a colour patch, or a combination of patches. Observers then grade their emotional response to the stimulus on some scale with psychologically-defined ends: for example "fresh-stale", "hard-soft", "tense-relaxed". Ou et al [1] conducted series or such experiments in which observers scored each colour against 10 such colour-emotion pairs (each pair defining a respective colour-emotion scale): warm-cool, heavy-light, modern-classical, clean-dirty, active-passive, hard-soft, tense-relaxed, fresh-stale, masculine-feminine and like-dislike. Ou et al also concluded that all 10 colour emotion pairs can be represented in only a three-dimensional colour emotion space (within the colour emotion domain) having the orthogonal axes (representing three colour-emotion scales defining the space) "colour activity" (active-passive scale), "colour weight" (heavy-light scale) and "colour warmth (warm-cool scale). Of the scales: colour activity comprises the three scales active-passive, clean-dirty and modern-classical: colour weight comprises the scales hard-soft. masculine-feminine and heavy-light; and colour warmth comprises the warm-cool scale. In practical terms, Ou et al have developed a forward mapping from the three-dimensional CIELAB colour encoding space (based on the three axes of lightness, green-red and blue-yellow) to a colour emotion space (based on the three colour emotion scales) within the colour emotion domain, which can be used to choose colour palettes having predefined emotional or harmonic properties.

It will be appreciated that many other colour emotion spaces, other than the one conceived by [1], exist within the colour emotion domain, and embodiments of the present invention are in no way limited to any one particular colour space.

In arriving at embodiments of the present invention, the present inventors have developed inverse colour emotion correction models that can be used to modify the emotional quality of full colour images. In particular, the present inventors have devised an approach to altering image attributes to change the emotional quality of an image, involving editing an image in a device-independent colour space, for example CIELAB or CIACAM02, while using the colour emotion model in [1] to guide the direction and magnitude. In particular, the present inventors have found that it is possible to use the colour emotion scales in [1] to modify images, whereby each pixel can be represented by coordinates in three-dimensional colour-emotion space, and the colour emotion value of the image is the mean of its pixels (though, in principle, according to embodiments of the invention, the colour emotion value could be based on a different statistical measure, such as median, mode, or the like). In addition, the present inventors have applied Sato's [2] principle wherein, in a uniform colour encoding space, a colour emotion value was said to be related to the distance (Euclidian, angular or other) from the colour having the minimum colour emotion grade on a relevant scale or, alternatively, inversely-related to the distance from the colour having the maximum colour emotion grade on a relevant scale This value will be referred to hereinafter as the 'colour emotion reference' and can be defined in terms of a single point in the colour encoding space (such as CIELAB L*, a* and b*) or a set of points having some common property, for example having the same CIELAB hue angle value h*.

Three exemplary inverse colour emotion correction models will be described below. In particular, according to the embodiments described herein, the models relate to colour activity, colour weight and colour warmth, which were selected based on the teaching in [1] to be the three axes in a three-dimensional colour emotion space within which image adjustments are made. The models are described in relation to CIELAB. However, it is emphasised that any other encoding colour space can be used, including device-independent spaces such as CIECAM02 and device-dependent spaces such as RGB or CMYK, provided the principles described herein are followed. It is also noted that the CIELAB values are computed according to standard formulae published by the CIE (CIE. 1978. *Recommendations on uniform color spaces, color-difference equations, psychometric color terms. Supplement No. 2 of the CIE Publication No* 15 (E-1.3.1) 1971. CIE, Central Bureau of the CIE, Paris, France).

Colour Activity

According to the present embodiments, the colour emotion reference is set to be a muddy greyish yellow corresponding to CIELAB coordinates [50, 3, 17] according to the finding in [1]. Hence, the measured colour activity of each image pixel is modified by Equation (1), for $L^*_a$, $a^*_a$ and $b^*_a$:

$$L^*_a = L^*_0(1 + k_a) + 50;$$
$$a^*_a = a^*_0(1 + k_a) + 3;$$
$$b^*_a = b^*_0\left(1 + \frac{k_a}{1.4}\right) + 17$$

Equation (1)

The three CIELAB coordinates represent the lightness of the colour (L*=0 yields black and L*=100 indicates white), its position between red/magenta and green (a*, negative values indicate green while positive values indicate magenta) and its position between yellow and blue (b*, negative values indicate blue and positive values indicate yellow). In Equation (1), $k_a$ is a correction coefficient controlling the extent of "colour activation" or "colour deactivation", whereby positive $k_a$ values lead to increased activity and negative values lead to reduced activity. $L^*_0$, $a^*_0$ and $b^*_0$ are the pixel's CIELAB coordinates shifted to the activity colour emotion reference; that is $L^*_0$ L*-50; $a^*_0$ a*-3; $b^*_0$ b*-17. In practice, an image processor according to embodiments of the present invention modifies the colour activity of each target pixel on the basis of a value of $k_a$ supplied to the processor.

The perceptual equivalent of Equation (1) is the modification of the lightness contrast and chroma contrast. However, the chroma contrast is modified relative to the activity colour emotion reference (that is, modifying the distance from the point [a=−3, b=17]), rather than the CIELAB origin. In doing so, the hue also changes by a small amount. As the result, the positive "activity" enhancement reduces the low-chroma yellowish tones while simultaneously increasing the chroma of the rest of the colours, which gives the feeling of a "cleaner" and more vivid image. Hence, more active images (relative to the original) will have higher lightness contrast with tones shifted to higher chroma blues and yellows; less active ones will be lower in lightness contrast and in chroma, and will have more yellowish low-chroma tones.

Colour Weight

In the model in [1], colour weight is determined by a combination of Euclidian distance of the L* coordinate from the white L*=100, and of the angular distance of colour's hue from the weight colour emotion reference hue h*-100, as shown in Equation (2):

$$h_w = \begin{cases} h_0 + h_0 \dfrac{(180 - h_0)}{180} w_C k_w + 100; & h_0 \leq 180 \\ h_0 + (360 - h_0) \dfrac{(h_0 - 180)}{180} w_C k_w + 100; & h_0 > 180 \end{cases} \quad \text{Equation (2)}$$

$$L_w = 100 \left(\dfrac{L}{100}\right)^7$$

Here, $k_w$ is a correction coefficient controlling the extent of increasing or reducing the colour weight for a target pixel, whereby positive $k_w$ values lead to increased weight and negative values lead to reduced weight: $h_0$ is the pixel's hue shifted towards the weight colour emotion reference hue, i.e. $h_0$–h–100, and $w_C$ is a weighting factor set according to the chroma C* of the original pixel as in Equation (3):

$$w_C = \left(1 - \dfrac{C^*}{150}\right)^3 \quad \text{Equation (3)}$$

Other chroma weighting functions may be applied by the skilled person.

As shown, the lightness L of the pixel is modified by a gamma function, whereby γ is the function of the correction magnitude and direction, that is γ–f(k). so that γ>1 to increase colour weight, and 0<γ<1 to reduce it.

The perceptual equivalent of colour weight can be described as the overall degree of lightness and "yellowness". Lighter (than the original) images will be yellower and brighter, with no deep shadows and high-contrast areas. Heavier images, on the other hand, will be bluer, dominated by shadows.

Colour Warmth

In the model in [1] the colour warmth index is dependent on a pixel colour's chroma and the angular distance from a warmth colour emotion reference hue, h 50. According to the present embodiment, chroma is modified according to Equation (4):

$$C_H^* = C^{*(1-0.03k)} \quad \text{Equation (4)}$$

and hue is modified as described in Equation (2), but using a different warmth colour emotion reference hue value of $h_0$–h–50, and replacing the coefficient $k_w$ with a different correction coefficient $k_H$ controlling the extent of "colour warming" or "colour cooling" for a target pixel, whereby positive $k_H$ values lead to increased warmth and negative values lead to reduced warmth.

The perceptual effect of enhancing the colour warmth is mostly in making the image more "red" and slightly more vivid (having higher chroma): where red and chroma are reduced to reduce the warmth.

Three alternative embodiments of the present invention will now be described by way of example. Each embodiment is an image processor which forms an image processing pipeline or elements thereof. In each case, the pipeline may comprise other elements (that are not shown for simplicity of understanding only), which may be upstream and/or downstream of the exemplified image processor. In the first embodiment, manual user input is required to provide colour emotion indicia expressed as emotional scale parameters, and image enhancement is applied according to those indicia, on the basis of the equations above. The ability for a user to specify image enhancements in terms of emotional (rather than technical) indicia is perceived to be a significant improvement over prior art image enhancement techniques, and would certainly find application in small scale photo printing or personal applications, where such user input would not be perceived as an undue overhead. In the second embodiment, a semi-automated example of the invention is provided, in which colour emotion indicia, expressed as emotional qualities for a given scene, are used to enhance images on the basis of respective 'ideal' colour emotion. The third embodiment applies automated image enhancement on the basis of automatically-derived image understanding techniques. This kind of example finds application, for example, in large commercial-scale photo printing situations, or in embedded applications (for example in printers, cameras, or image viewing applications such as web browsers), where user input or intervention might be perceived as impractical or an undue burden. For example, the third embodiment of the invention may find application in processing laboratories that may process many thousands or millions of images a day; where the overhead of manual data entry to characterise images understanding would be unacceptable.

Figure 2:
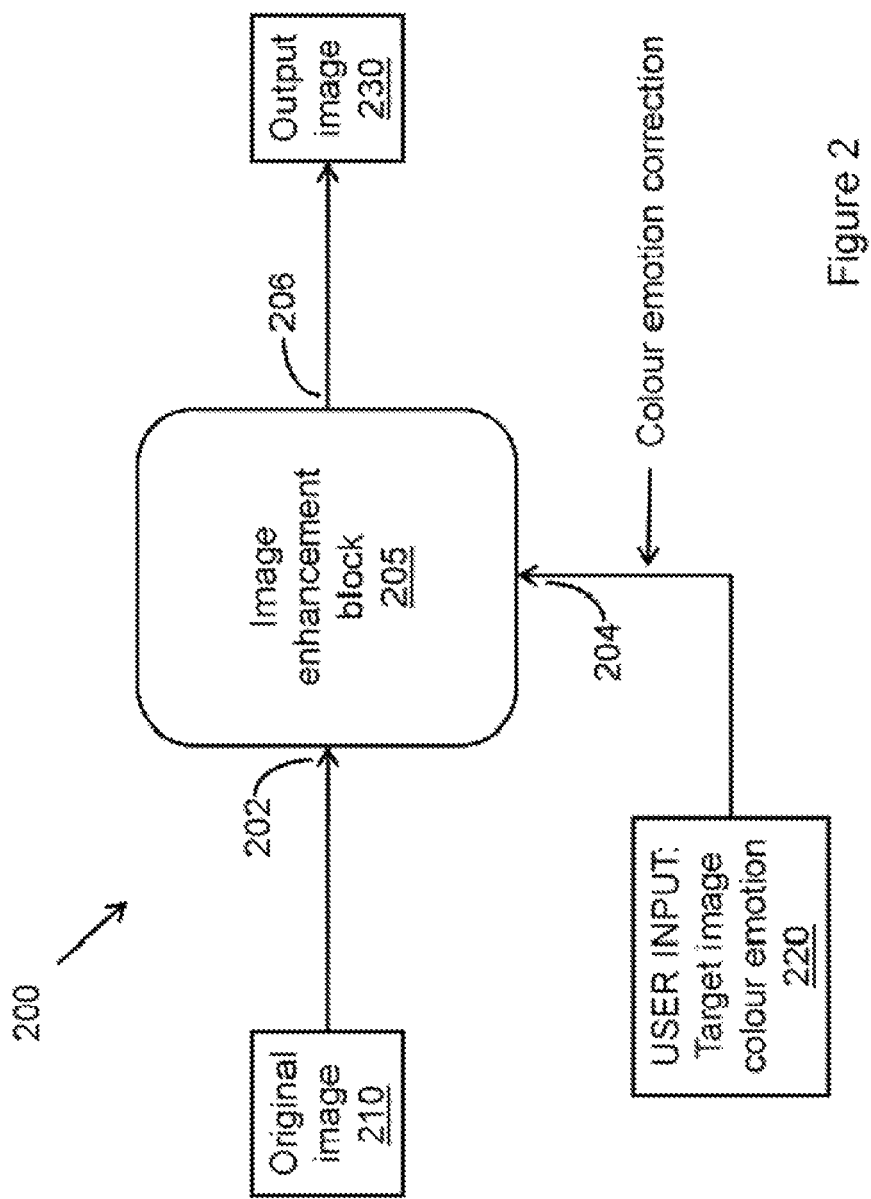
FIG. 2 is a diagram of an image processor according to a first embodiment of the present invention.

The first exemplary embodiment of the present invention will now be described with reference to FIG. 2. In FIG. 2, the image processor comprises an image enhancement block 205, comprising an input 202 for receiving data comprising an original image 210 and an input 204 for receiving user-specified colour emotion indicia, which are used for varying the emotional quality of the image. The image is original insofar as it is new to the image enhancement block 205: it may of course have been processed in some way upstream of the image enhancement block 205. The user-specified colour emotion indicia, in effect, constitute a colour emotion correction input to the image enhancement block 205. The image enhancement block 205 also comprises an output 206 for transmitting the enhanced output image data 230 downstream in the pipeline.

The image enhancement block 205 (and other blocks described hereinafter) comprises software code, written in an appropriate programming language, such a C++, which can execute on a programmable processor, for example an Intel™ processor. If the block is implemented on a printer or camera, it may be embodied as compiled code, if there is an on-board programmable processor, or as firmware controlling an embedded processor or even as a programmed ASIC.

According to the present embodiment, the colour emotion indicia are colour activity, colour weight and colour warmth parameters, as characterised above. More particularly, in this embodiment, the parameters are specified using relative measures, for example, in terms of percentage increments or decrements relative to the original image. In practice, the values may be entered by a user via a graphical user interface, for example comprising slider scales that can be manipulated by the user; or in any other convenient manner. The system then uses the entered values to generate the appropriate k values within an appropriate encoding range (for example 0-255 in an 8-bit encoding scheme. In this embodiment, the system needs no indication of what the emotional quality of the original image is or what value the original colour emotion values are; it simply applies the equations according to the input provided.

Figure 3:
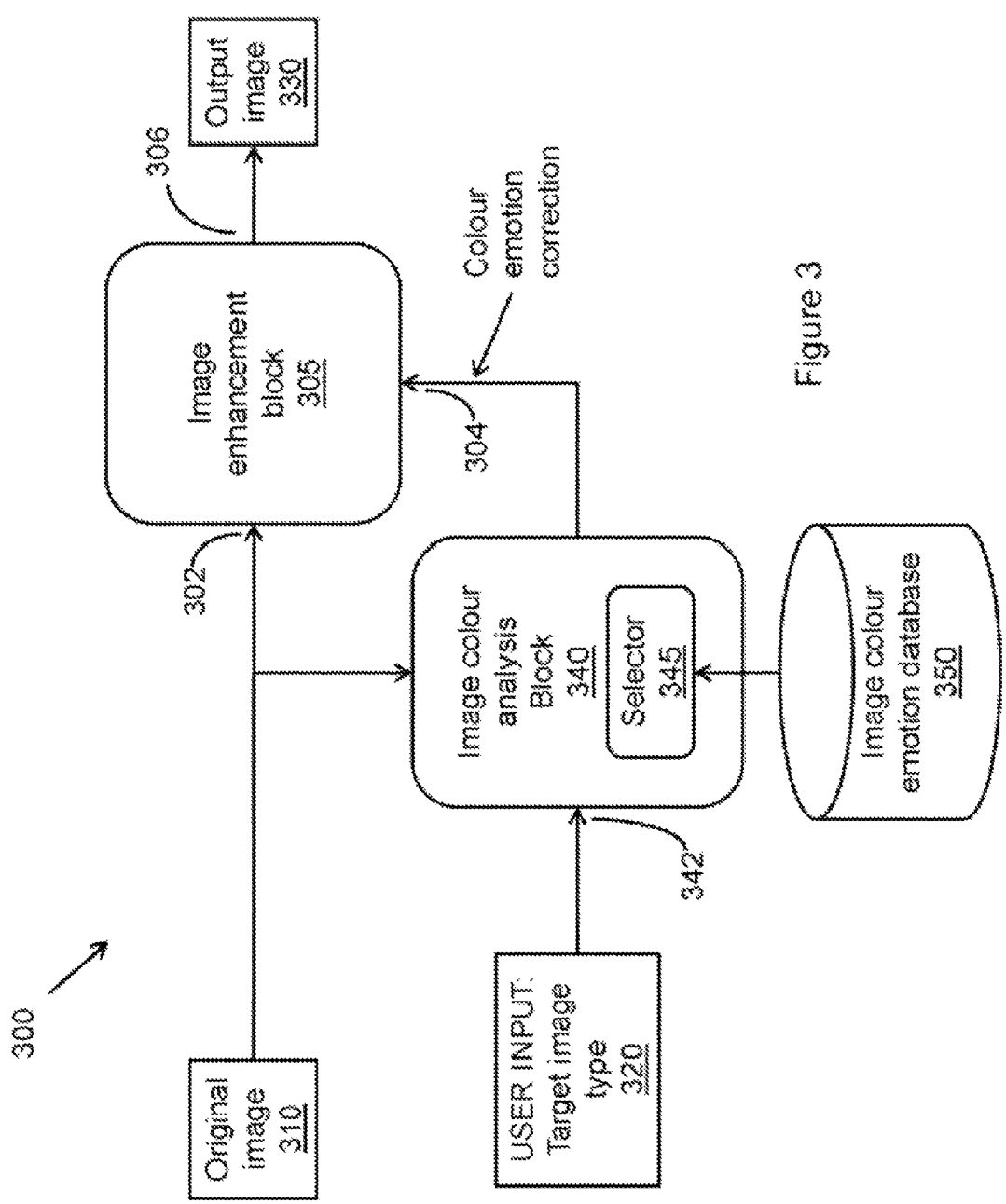
FIG. 3 is a diagram of an image processor according to a second embodiment of the present invention.

The second embodiment of the present invention is illustrated in FIG. 3. As in FIG. 2, the embodiment illustrated in FIG. 3 is an image processor that comprises an image enhancement block 305, with an input 302 for receiving image data, an input for receiving a colour emotion correction and an output for transmitting the enhanced output image data 330 downstream in the pipeline. In this embodiment, the colour emotion correction is generated by an image colour analyser in the form of an image colour analysis block 340, which receives a colour emotion indicia input 320 from a user, in the form of an image scene classification, aid has access to an image colour emotion database 350 of colour emotions for ideal scenes. The image colour analysis block 340 includes a selector 345, for selecting the appropriate colour emotions from the database 350 on the basis of an image scene classification. The content of the user input 320 can take various forms. In the present embodiment, the input classifies the kind of image in terms of the image scenario, for example 'sports event', 'funeral', 'family scene', to name just a few possible scenarios. Again, the choice of scene may be made by a user selecting one of various provided menu selections in a graphical user interface. Equally, other techniques for classifying the image may be used. For example, known natural language understanding could be used to classify an image as a 'party', on the basis of a user designation of "David's birthday photos". Many alternative ways of classifying an image on the basis of a user input may be applied without limitation.

The image colour analysis block 340, which also receives the image data 310 as an input, computes the current emotion of the image scene and compares that to colour emotions, stored in the database 350 and selected by the selector 345, for 'ideal' scenes of the designated kind.

According to the present embodiment, each ideal scene's colour emotion is a point in a colour emotion space defined by the three scales of colour activity, colour weight and colour warmth. For example, the colour emotion of an image of a sports game might be characterised by a high value on the 'active-passive' axis, the colour emotion of an image of a wedding might be characterised by high values on 'warm-cool' and 'heavy-light' axes, and the colour emotion of an image of a funeral may be characterised by low values on 'warm-cool' and 'heavy-light' axes.

Figure 4:
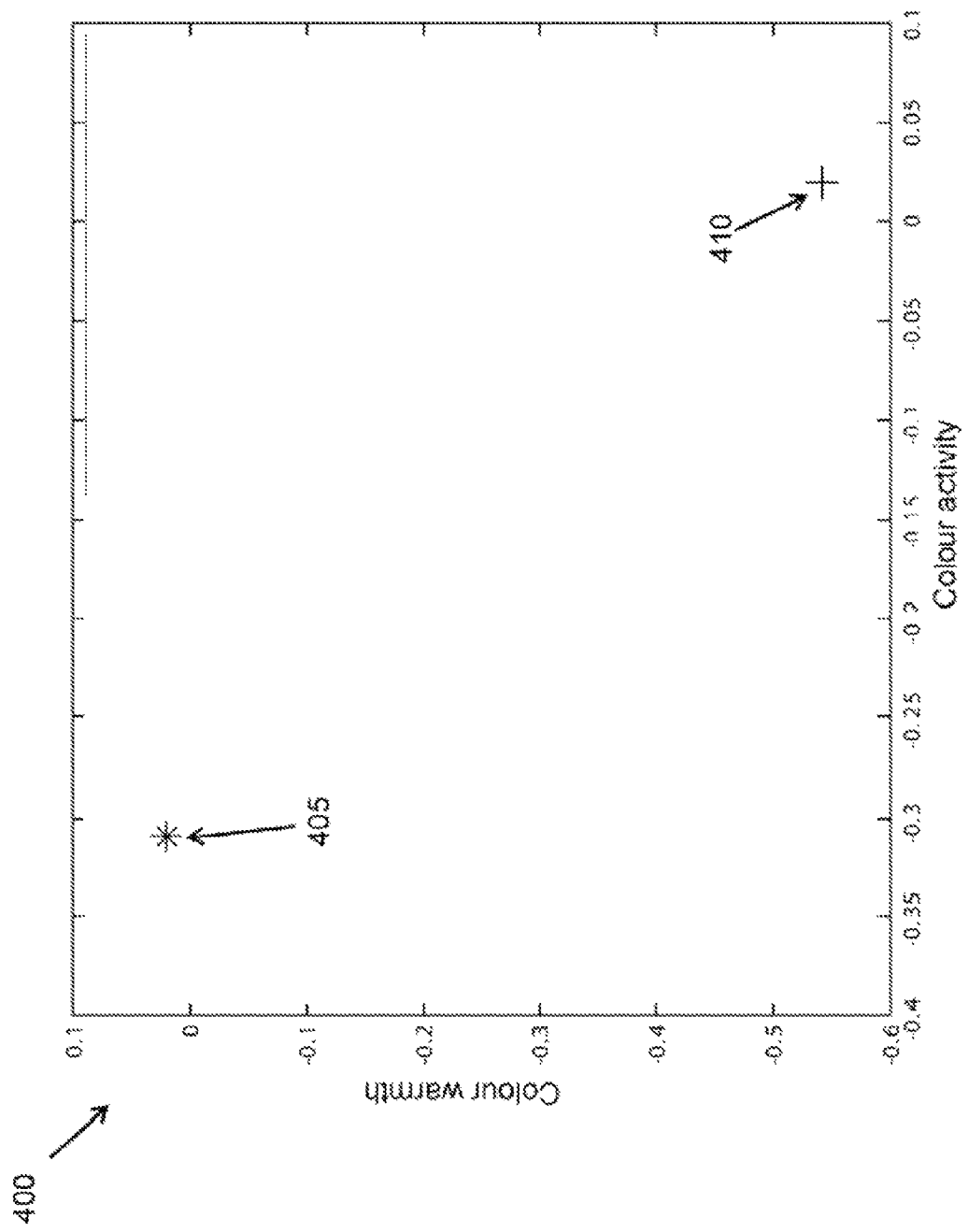
FIG. 4 is a graph showing a two-dimensional colour emotion model.

The graph in FIG. 4 illustrates a colour emotion in the form of a projection 400 of mean colour emotion coordinates. In this instance only two dimensions of the colour emotion are shown, representing an activity-warmth (x-y) plane. A first point 405 in the plane has a relatively low colour activity and a relatively high colour warmth, and is found to be typical for indoor portrait scenes. A second point 410 has a relatively high colour activity and a relatively low colour warmth, and is found to be typical for sunny landscape scenes. Various other examples of two and three dimensional colour emotion spaces are described in [1].

The image colour analysis block 340 determines the emotion of the current image by expressing each pixel in the three-dimensional colour-emotion space (using the equations 6-8 from [1]) and calculating the mean of its pixels. Then, the selector 345 selects the appropriate ideal colour emotion from the image colour emotion database 350, for the type of image defined by the user, and compares the calculated value of the image colour emotion with the "ideal" colour emotion. If the value is not the same as that required by the respective ideal colour emotion (or, indeed, within a certain threshold thereof), the colour analysis block 340 supplies a respective colour emotion correction value, whereby the image enhancement block 305 then shifts the image colours towards the ideal values, by applying the equations above. If the image colour emotion value is already close enough to the ideal colour emotion values, for example within a predetermined threshold, the image enhancement block 305 is not required to enhance the image. One way of determining whether the difference is greater than the threshold is to estimate the colour difference between the original image and a corrected image, and compare this with the Just Noticeable Difference threshold, which is available from the colour science literature (for example, according to Webber's Law, "Just Notice-able Difference" is the minimum amount by which stimulus intensity must be changed in order to produce a noticeable variation in sensory experience). If the difference is below the threshold then the correction will not have an appreciable effect and is not applied. In embodiments of the invention, this threshold estimation is done using a thumbnail version of the image, having a greatly reduced number of pixels (for example 100 pixels on the short dimension of the image rather than, perhaps, thousands of pixels), in order to speed the process up. Indeed, the image analysis block 340 may in fact include a down-sampling process (not shown) and operate entirely on a down-sampled version of the original image data, in order to increase efficiency.

In other embodiments, the user inputted colour emotion indicia may instead comprise a relative indication of the target colour emotion, for example 'make the scene happier', 'make the scene more exciting' or the like. Other ways of characterising the colour emotion indicia are possible and should not be limited to the particular examples described herein.

The third embodiment of the present invention is illustrated in the diagram in FIG. 4. According to this embodiment, the image processor comprises an image enhancement block 505, which has an input 502 for receiving original image data 510, an input 504 for receiving a colour emotion correction signal and an output 530 for providing enhanced image data downstream in a respective image processing pipeline. The colour emotion correction signal in this case is supplied by an image understanding block 515, which also receives the original image data 510 (which, again, can be down-sampled for performance improvement). The image understanding block 515 comprises an image content analyser in the form of an image analysis block 522, an image colour analysis block 540, including a selector 545, and an image colour emotion database 550, containing colour emotions of ideal scenes, generally as described for the second embodiment. The image content analysis block 522 determines an image classification (for example, whether the image is a wedding scene, a sports event scene or a landscape scene). Finally, there is an optional global preference input 520, the purpose of which will be described in more detail below, which can provide an input into either or both the image understanding block 515 or the image enhancement block 505.

The image content analysis block 522 applies a range of known image processing and analysis techniques to acquire image statistics and to discern image elements such as objects, the presence of people, whether it is an indoor or an outdoor image etc. From that data, the image classification (for example, an indoor domestic scene or an outdoor sports game scene) is determined automatically. Image understanding techniques are well known and form a large and ever growing body of literature and research and development study. For example, known image segmentation techniques allow dividing an image area into perceptually meaningful regions and individual objects within the scene can be recognised [4], spatial configuration (perspective, occlusions, etc.) can be identified [5,6], and detection of human faces [7,8] is a rapidly developing topic boosted by its numerous applications in image enhancement, surveillance and others. Any one or more of these and, indeed, other known techniques can be applied in the image content analysis block 522 to classify an image scene automatically.

The output of the image content analysis block 522 is used, by the selector 545 to select an appropriate ideal scene colour emotion from the image colour emotion database 550. The image colour analysis block 540 then generates a colour emotion correction signal, as described in the second embodiment, and the image enhancement block 505 (if required) adjusts the image attributes to obtain the required emotional quality.

The optional global preference input 520 can be a manual or automated input process, which can provide information which is used by the image understanding block 515 (or directly by the image enhancement block) to modify the colour emotion correction signal for some or, indeed, all processed images within a group. For instance, the input might be responsive to data indicating the kind of camera used to take the respective photos: for example, some cameras are known to reproduce colours in a way which renders images cool or inactive. Then, the input may be derived from a database of camera characteristics (not shown), which, for example, might dictate that images captured using the camera should be enhanced to make them warmer or more active than might otherwise be the case. In a manual input embodiment, the global preference input may permit a user to simply state that all images should be warmer and lighter than the ideal for the kind of image being processed (for example, simply because the photographer wants that to be the case). In any event, the image understanding block (or image enhancement block 505) uses the global preference input 520 as an adjustment to the colour emotion correction signal.

Figure 5:
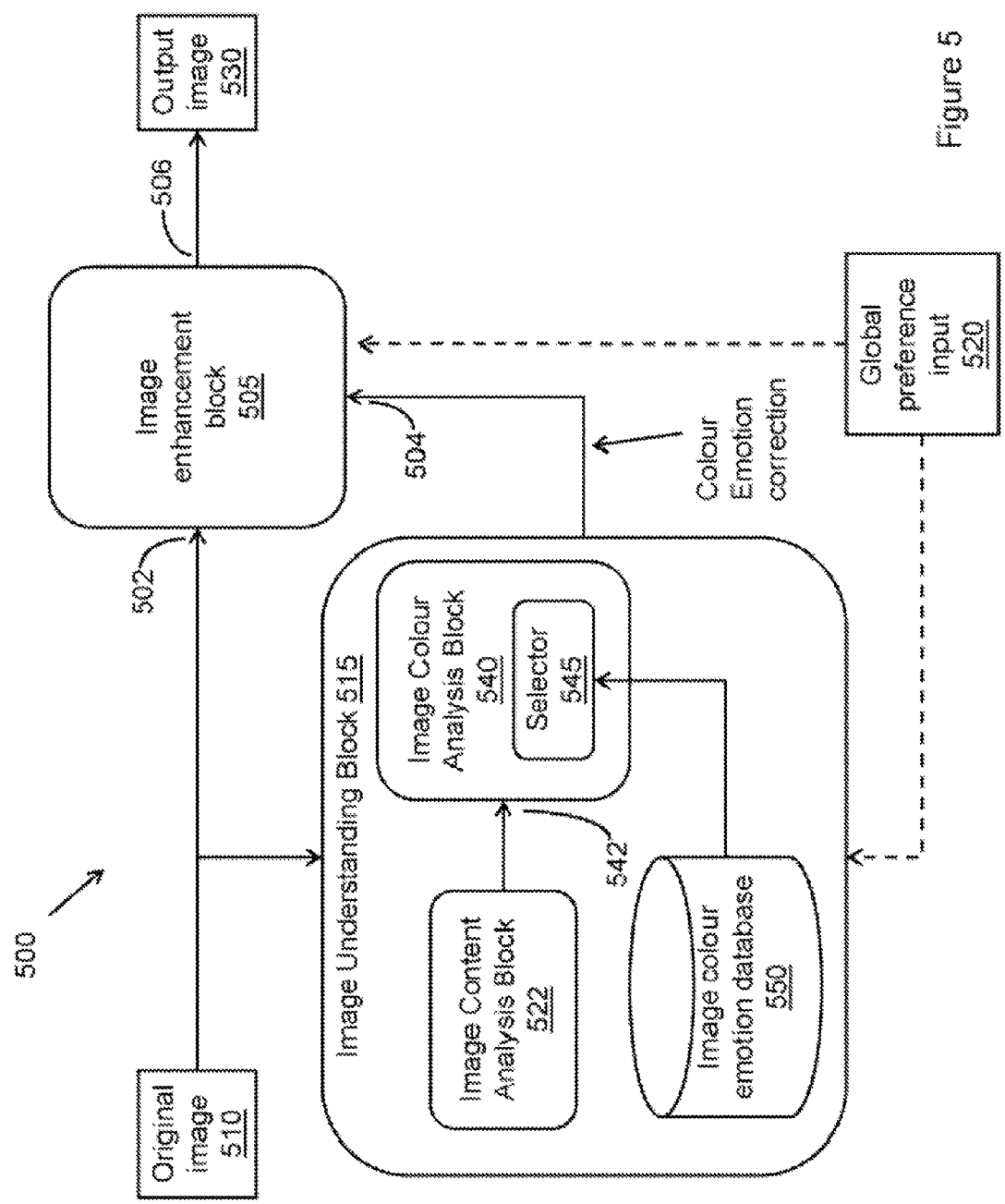
FIG. 5 is a diagram of an image processor according to a third embodiment of the present invention.
Figure 6:
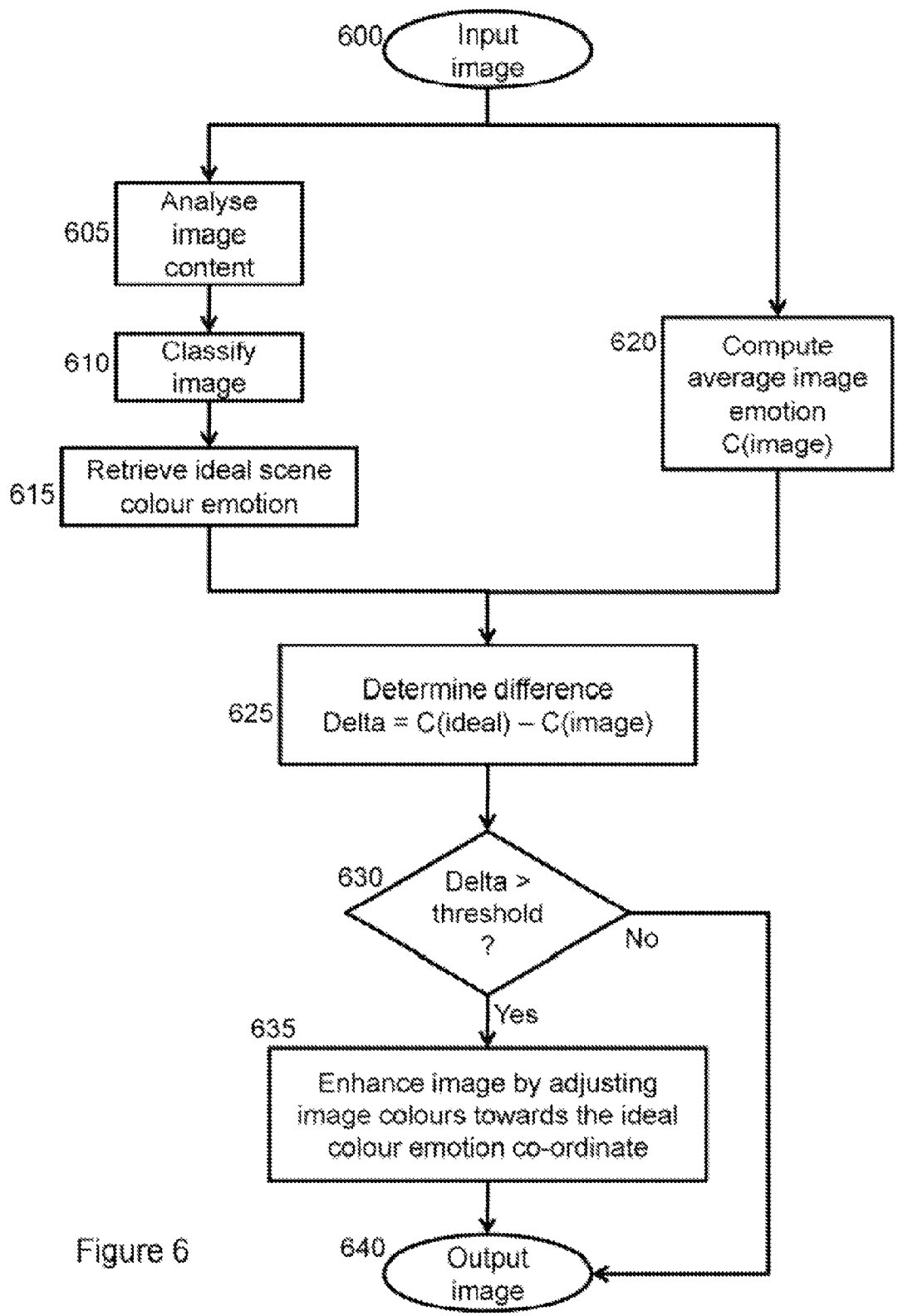
FIG. 6 is a flow diagram illustrating an image enhancement process according to an embodiment of the present invention.

An exemplary automated image enhancement process will now be described with reference to the diagram in FIG. 4 and the flow diagram in FIG. 5. In a first step [600] original image data is input into the image understanding block 515. The image content analysis block 522 analyses the image [605] by applying known image understanding techniques in order to classify the image [610]. The image classification is used [615] by the selector 545 to retrieve a respective ideal image colour emotion from the image colour emotion database 550. The image colour analysis block 540 computes [620] an average image emotion value C(image) [620] for the original image. The image colour analysis block 540 determines [625] the difference (Delta) between the average image emotion value of the original image C(image) and the average image emotion value of an enhanced version of the image C(ideal), using a thumbnail version of the image for reasons of efficiency. Next [630], the image colour analysis block 540 determines if the difference Delta is greater than a specified threshold. If not, the image data is passed through the pipeline and output [640] without any enhancement or adjustment of the image. If the difference is greater than the threshold then the image is enhanced [635] according to the selected ideal colour emotion, for example, using one or more of equations (1)-(3), and then output [640].

According to embodiments of the invention, target pixels being corrected could be all pixels in an image, if the entire image is being processed. This would most likely be the case for the first and second embodiments, in which relatively simple correction information can be provided by a user. However, in other embodiments, target pixels may be a subset of all pixels in an image. For example, target pixels may be all pixels in a local area, for example defining a feature, region or person. This option finds particular application in the third embodiment, in which image content is analysed and understood: it being possible then to identify target pixels forming particular features, regions or people. In addition, or alternatively, target pixels may be a subset of all pixels defined in terms of class, for example pixels of a certain colour (or colour band). In any event, k values in respective correction models may be constant for all pixels in an image (for example when all pixels are target pixels), or may, for example, vary in a defined way (for example, varying smoothly over an image region) when target pixels form an identified subset of an image, such as a feature, region or person. In general, there is no reason why the k values cannot be varied in any appropriate way, determined by the skilled person, in order to imbue an image with the desired colour emotion character; and there is no reason why k might not be different, in the limit, for every target pixel.

The above embodiments are to be understood as illustrative examples of the invention. Further embodiments of the invention are envisaged. For example, in each embodiment, the image processor is described in terms of particular blocks and elements. It will be appreciated that different arrangements of blocks and elements may be used instead without departing from the invention. In addition, or alternatively, different colour emotion scales may be used and different colour emotion spaces may be applied. It is to be understood that any feature described in relation to any one embodiment may be used alone, or, if the context permits, in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. Apparatus for processing an image, comprising:

a memory storing processor-readable instructions; and a processor coupled to the memory, operable to execute the instructions, and based at least in part on the execution of the instructions operable to perform operations comprising receiving colour emotion indicia corresponding to coordinates in a colour emotion space defined by colour emotion scales, based on the colour emotion indicia, identifying at least one color emotion correction model that maps a coordinate of a pixel value in a colour encoding space to an adjusted coordinate value in the colour encoding space based on a respective value of a colour correction coefficient of the color emotion correction model, determining the respective value of the colour correction coefficient based on the colour emotion indicia, mapping values of target pixels of the image in the colour encoding space to adjusted pixel values in the colour encoding space, wherein the mapping comprises ascertaining a respective mapping function by applying the respective color correction coefficient values to the respective colour emotion correction model and applying the mapping function to respective ones of the values of the target pixels, and outputting image pixel data based on the adjusted pixel values.

2. Apparatus according to claim 1, wherein the colour emotion indicia are parameters of the colour emotion scales.

3. Apparatus according to claim 1, wherein the colour emotion indicia represent a point in the colour emotion space.

4. Apparatus according to claim 1, wherein the colour emotion space is defined by three colour emotion scales.

5. Apparatus according to claim 2, wherein colour emotion scales are colour activity, colour weight and colour warmth.

6. Apparatus according to claim 5, wherein the mapping comprises, for each target pixel having respective CIELAB colour coordinate values $L^*$, $a^*$, and $b^*$, determining colour activity adjusted CIELAB color coordinate values $L^*_a$, $a^*_a$, and $b^*_a$ for the target pixel in accordance with:

$$L^*_a = L^*_0(1 + k_a) + L_r$$

$$a^*_a = a^*_0(1 + k_a) + a_r$$

$$b^*_a = b^*_0\left(1 + \frac{k_a}{1.4}\right) + b_r$$

wherein $k_a$ is a correction coefficient for the target pixel, and $L^*_0$, $a^*_0$, and $b^*_0$ are the CIELAB colour coordinates of the target pixel shifted to a color emotion reference having CIELAB colour coordinates $L_r$, $a_r$, and $b_r$.

7. Apparatus according to claim 5, wherein the mapping comprises, for each target pixel having respective CIELAB colour coordinate values L, a, and b, a CIELAB hue angle value h, and a chroma value C, determining colour weight adjusted CIELAB color coordinate values $L_w$ and $b_w$ for the target pixel in accordance with:

$$h_w = \begin{cases} h_0 + h_0 \frac{(180 - h_0)}{180} w_C k_w + h_r; & h_0 \geq 180 \\ h_0 + (360 - h_0)\frac{(h_0 - 180)}{180} w_C k_w + h_r; & h_0 > 180 \end{cases}$$

$$L_w = 100\left(\frac{L}{100}\right)^\gamma$$

wherein $k_w$ is a correction coefficient for the target pixel, $h_0$ is the CIELAB colour coordinates of the target pixel shifted to a weight color emotion reference hue $h_r$, and $w_c$ is a weighting factor that is set according to a chroma weighting function of the chroma value C.

8. Apparatus according to claim 5, wherein the mapping comprises, for each target pixel having respective CIELAB colour coordinate values L, a, and b, a CIELAB hue angle value h, and a chroma value C, determining colour warmth adjusted CIELAB color coordinate hue values $h_w$ and $C_w$ for the target pixel in accordance with $$h_w = \begin{cases} h_0 + h_0 \frac{(180 - h_0)}{180} w_C k_w + h_r; & h_0 \geq 180 \\ h_0 + (360 - h_0)\frac{(h_0 - 180)}{180} w_C k_w + h_r; & h_0 > 180 \end{cases}$$

and determining colour warmth adjusted CIELAB color coordinate chroma values $C_w$ for the target pixel in accordance with a chroma weighting function of the chroma value C, wherein $k_w$ is a correction coefficient for the target pixel, $h_0$ is the CIELAB colour coordinates of the target pixel shifted to a warmth color emotion reference hue $h_r$, and $w_c$ is a weighting factor that is set according to chroma weighing function of the chroma value C.

9. Apparatus according to claim 6, wherein each adjustment is determined relative to a specified colour emotion reference.

10. An image processor, comprising:
an input to receive image pixel data, an input to receive colour emotion indicia;
an input to receive a scene classification; and
a selector to select on the basis of the classification one from a plurality of stored colour emotions for ideal image scenes,
wherein the processor is arranged to adjust target pixels of the image in a colour encoding space on the basis of the colour emotion indicia and to output image pixel data resulting therefrom.

11. An image processor according to claim 10, comprising a colour analyser to calculate and compare an emotion of image pixel data of an inputted image, having an associated classification, with a selected emotion for a respective ideal image scene for the classification.

12. An image processor according to claim 11, wherein the colour emotion of image pixel data of an inputted image is a statistical function of the colour emotion of the target pixels.

13. An image processor according to claim 12, wherein the colour emotion of image pixel data of an inputted image is calculated to be the mean colour emotion of the target pixels.

14. An image processor according to claim 11, comprising a content analyser to analyse image pixel data of an inputted image and generate, on the basis of identified content, a respective image classification for input to the colour analyser.

15. A method for processing an image, comprising:
receiving colour emotion indicia corresponding to coordinates in a colour emotion space defined by colour emotion scales'
based on the colour emotion indicia, identifying at least one color emotion correction model that maps a coordinate of a pixel value in a colour encoding space to an adjusted coordinate value in the colour encoding space based on a respective value of a colour correction coefficient of the color emotion correction model,
determining the respective value of the colour correction coefficient based on the colour emotion indicia,
mapping values of target pixels of the image in the colour encoding space to adjusted pixel values in the colour encoding space, wherein the mapping comprises ascertaining a respective mapping function by applying the respective color correction coefficient values to the respective colour emotion correction model and applying the mapping function to respective ones of the values of the target pixels, and
outputting image pixel data based on the adjusted pixel values.

16. Apparatus according to claim 1, further comprising determining a colour emotion reference coordinate in the colour encoding space based on values of pixels of the image, and wherein the at least one color emotion correction model maps a coordinate of a pixel value in the colour encoding space to an adjusted coordinate value in the colour encoding space relative to the colour emotion reference coordinate.

* * * * *

UNITED STATES PATENT AND TRADEMARK OFFICE
CERTIFICATE OF CORRECTION

PATENT NO.        : 8,861,849 B2                                    Page 1 of 1
APPLICATION NO.   : 13/145107
DATED             : October 14, 2014
INVENTOR(S)       : Boris Oicherman et al.

It is certified that error appears in the above-identified patent and that said Letters Patent is hereby corrected as shown below:

In the Claims,

In column 11, line 23, in Claim 7, delete "$h_0 \geq 180$" and insert -- $h_0 \leq 180$ --, therefor.

In column 11, line 43, in Claim 8, delete "$h_0 \geq 180$" and insert -- $h_0 \leq 180$ --, therefor.

In column 12, line 32, in Claim 15, delete "scales'" and insert -- scales, --, therefor.

Signed and Sealed this
Twenty-fourth Day of February, 2015

Michelle K. Lee
*Deputy Director of the United States Patent and Trademark Office*